(12) United States Patent
Weir et al.

(10) Patent No.: US 7,595,109 B2
(45) Date of Patent: Sep. 29, 2009

(54) ELECTRICAL-ENERGY-STORAGE UNIT (EESU) UTILIZING CERAMIC AND INTEGRATED-CIRCUIT TECHNOLOGIES FOR REPLACEMENT OF ELECTROCHEMICAL BATTERIES

(75) Inventors: Richard Dean Weir, Cedar Park, TX (US); Carl Walter Nelson, Austin, TX (US)

(73) Assignee: EEStor, Inc., Cedar Park, TX (US)

( * ) Notice: Subject to any disclaimer, the term of this patent is extended or adjusted under 35 U.S.C. 154(b) by 0 days.

(21) Appl. No.: 11/400,875

(22) Filed: Apr. 10, 2006

(65) Prior Publication Data
US 2006/0210779 A1 Sep. 21, 2006

Related U.S. Application Data

(63) Continuation of application No. 09/833,609, filed on Apr. 12, 2001, now Pat. No. 7,033,406.

(51) Int. Cl.
*B32B 5/66* (2006.01)

(52) U.S. Cl. ........................ 428/403; 428/404; 428/405; 428/406; 428/407; 428/209; 429/247; 29/623.1; 29/623.5

(58) Field of Classification Search ......... 428/403–407, 428/400, 209; 429/247; 29/623.1, 623.5
See application file for complete search history.

(56) References Cited

U.S. PATENT DOCUMENTS

| | | | |
|---|---|---|---|
| 3,947,553 A | 3/1976 | Moss | |
| 4,054,598 A | 10/1977 | Blum et al. | |
| 4,671,618 A | 6/1987 | Wu et al. | |
| 4,733,328 A | 3/1988 | Blazej | |
| 4,772,576 A | 9/1988 | Kimura et al. | |
| 4,834,952 A | 5/1989 | Rollat | |
| 4,839,339 A | 6/1989 | Bunker et al. | |
| 5,011,804 A | 4/1991 | Bergna et al. | |
| 5,017,446 A | 5/1991 | Reichman et al. | |
| 5,043,843 A | 8/1991 | Kimura et al. | |
| 5,045,170 A | 9/1991 | Bullock et al. | |
| 5,082,811 A | 1/1992 | Bruno | |
| 5,087,437 A | 2/1992 | Bruno et al. | |
| 5,116,560 A | 5/1992 | Dole et al. | |
| 5,116,790 A | 5/1992 | Bruno et al. | |
| 5,196,388 A | 3/1993 | Shyu | |
| 5,242,674 A | 9/1993 | Bruno et al. | |
| 5,340,510 A | 8/1994 | Bowen | |
| 5,362,472 A | 11/1994 | Lauter et al. | |
| 5,407,618 A | 4/1995 | Stephenson | |
| 5,417,956 A | 5/1995 | Moser | |
| 5,711,988 A | 1/1998 | Tsai et al. ........................ 427/80 |
| 5,730,874 A | 3/1998 | Wai et al. | |
| 5,731,948 A | 3/1998 | Yializis et al. | |
| 5,738,919 A | 4/1998 | Thomas et al. ................. 429/3 |
| 5,744,258 A | 4/1998 | Bai et al. ........................ 429/3 |
| 5,776,239 A | 7/1998 | Bruno | |
| 5,797,971 A | 8/1998 | Zheng et al. ................. 29/25.03 |
| 5,800,857 A | 9/1998 | Ahmad et al. .................. 427/80 |
| 5,833,905 A | 11/1998 | Miki | |
| 5,850,113 A | 12/1998 | Weimer et al. ............... 307/125 |
| 5,867,363 A | 2/1999 | Tsai et al. ..................... 361/502 |
| 5,900,223 A | 5/1999 | Matijevic et al. | |
| 5,929,259 A | 7/1999 | Lockemeyer | |
| 5,973,175 A | 10/1999 | Bruno | |
| 5,973,913 A | 10/1999 | McEwen et al. ............. 361/523 |
| 6,005,764 A | 12/1999 | Anderson et al. ........... 361/500 |
| 6,072,688 A | 6/2000 | Hennings et al. | |
| 6,078,494 A * | 6/2000 | Hansen ..................... 361/321.5 |
| 6,195,249 B1 | 2/2001 | Honda et al. | |
| 6,228,161 B1 | 5/2001 | Drummond | |
| 6,243,254 B1 | 6/2001 | Wada et al. .................. 361/311 |
| 6,268,054 B1 * | 7/2001 | Costantino et al. .......... 428/403 |
| 6,294,620 B1 | 9/2001 | Huang et al. | |
| 6,296,716 B1 | 10/2001 | Haerle et al. | |
| 6,331,929 B1 | 12/2001 | Masuda | |
| 6,352,681 B1 | 3/2002 | Horikawa et al. | |
| 6,410,157 B1 | 6/2002 | Nakamura | |
| 6,447,910 B1 | 9/2002 | Wataya | |
| 6,485,591 B1 | 11/2002 | Nakao | |

(Continued)

FOREIGN PATENT DOCUMENTS

EP 1020487 A1 7/2000

(Continued)

OTHER PUBLICATIONS

Bruno et al., "High-Performance Multilayer Capacitor Dielectrics from Chemically Prepared Powders," Journal of the American Ceramic Society, vol. 76, No. 5, pp. 1233-1241, 1993.

J. Kuwata et al., "Electrical Properties of Perovskite-Type Oxide Thin-Films Prepared by RF Sputtering", Jpn J. Appl. Phys., Part I, 1985, 413-15.

F. Sears et al., "Capacitance—Properties of Dielectrics", University of Physics, Addison Wesley Publishing Company, Inc., Feb. 1984, pp. 516-533.

Mitsubishi Polyester Film Corporation specification sheet for Hostaphan (R) RE film for capacitors, Copyright 2007.

(Continued)

*Primary Examiner*—Leszek Kiliman

(57) ABSTRACT

An electrical-energy-storage unit (EESU) has as a basis material a high-permittivity composition-modified barium titanate ceramic powder. This powder is double coated with the first coating being aluminum oxide and the second coating calcium magnesium aluminosilicate glass. The components of the EESU are manufactured with the use of classical ceramic fabrication techniques which include screen printing alternating multilayers of nickel electrodes and high-permittivitiy composition-modified barium titanate powder, sintering to a closed-pore porous body, followed by hot-isostatic pressing to a void-free body.

22 Claims, 1 Drawing Sheet

U.S. PATENT DOCUMENTS

Figure 1:
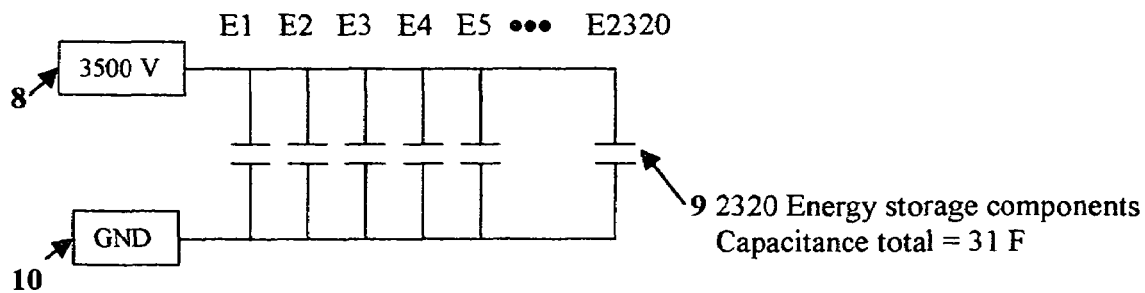

| | | | |
|---|---|---|---|
| 6,501,639 B2 | 12/2002 | Takafuji | |
| 6,550,117 B1 | 4/2003 | Tokuoka | |
| 6,673,274 B2 | 1/2004 | Venigalla et al. | |
| 6,692,721 B2 | 2/2004 | Hur et al. | |
| 6,703,719 B1 | 3/2004 | McConnell | |
| 6,715,197 B2 | 4/2004 | Okuyama | |
| 6,749,898 B2 | 6/2004 | Nakamura | |
| 6,905,989 B2 * | 6/2005 | Ellis et al. | 501/32 |
| 7,033,406 B2 | 4/2006 | Weir et al. | |
| 7,061,139 B2 | 6/2006 | Young | |
| 7,068,898 B2 | 6/2006 | Buretea et al. | |
| 7,228,050 B1 | 6/2007 | Buretea et al. | |
| 2001/0010367 A1 | 8/2001 | Burnell-Jones | |
| 2002/0186522 A1 | 12/2002 | Honda et al. | |
| 2003/0052658 A1 | 3/2003 | Baretich | |
| 2004/0135436 A1 | 7/2004 | Gilbreth | |
| 2007/0148065 A1 | 6/2007 | Weir et al. | |
| 2008/0016681 A1 | 1/2008 | Eisenring | |

FOREIGN PATENT DOCUMENTS

| | | |
|---|---|---|
| JP | 55154321 | 12/1980 |
| JP | 11147716 A | 6/1999 |
| JP | 2003192343 | 7/2003 |
| WO | WO 93/16012 | 8/1993 |

OTHER PUBLICATIONS

U.S. Appl. No. 11/499,594.
U.S. Appl. No. 10/917,144.
U.S. Appl. No. 11/453,581.
U.S. Appl. No. 11/497,744.
Beheir et al., "Studies on the liquid-liquid extraction and ion and precipitate flotation of Co(II) with decanoic acid," Journal of Radioanalytical and Nuclear Chemistry, Articles, vol. 174, No. 1 (1993) 13-22.

* cited by examiner

ELECTRICAL-ENERGY-STORAGE UNIT (EESU) UTILIZING CERAMIC AND INTEGRATED-CIRCUIT TECHNOLOGIES FOR REPLACEMENT OF ELECTROCHEMICAL BATTERIES

This application is a continuation of U.S. patent application Ser. No. 09/833,609 now U.S. Pat. No. 7,033,406, entitled "Electric-Energy-Store Unit (EESU) Utilizing Ceramic and Integrated-Circuit Technologies for Replacement of Electrochemical Batteries," filed Apr. 12, 2001, and naming Richard Dean Weir and Carl Walter Nelson as the inventors.

BACKGROUND OF THE INVENTION

1. Field of the Invention

This invention relates generally to energy-storage devices, and relates more particularly to high-permittivity ceramic components utilized in an array configuration for application in ultrahigh-electrical-energy storage devices.

2. Description of the Relevant Art

The internal-combustion-engine (ICE) powered vehicles have as their electrical energy sources a generator and battery system. This electrical system powers the vehicle accessories, which include the radio, lights, heating, and air conditioning. The generator is driven by a belt and pulley system and some of its power is also used to recharge the battery when the ICE is in operation. The battery initially provides the required electrical power to operate an electrical motor that is used to turn the ICE during the starting operation and the ignition system. The most common batteries in use today are flooded lead-acid, sealed gel lead-acid, Nickel-Cadmium (Ni-Cad), Nickel Metal Hydride (NiMH), and Nickel-Zinc (Ni-Z). References on the subject of electrolchemical batteries include the following: Guardian, Inc., "Product Specification": Feb. 2, 2001; K. A. Nishimura, "NiCd Battery", Science Electronics FAQ V1.00: Nov. 20, 1996; Ovonics, Inc., "Product Data Sheet": no date; Evercel, Inc., "Battery Data Sheet-Model 100": no date; S. R. Ovshinsky et al., "Ovonics NiMH Batteries: The Enabling Technology for Heavy-Duty Electrical and Hybrid Electric Vehicles", Ovonics publication 2000-01-3108: Nov. 5, 1999; B. Dickinson et al., "Issues and Benefits with Fast Charging Industrial Batteries", AeroVeronment, Inc. article: no date.

Each specific type of battery has characteristics, which make it either more or less desirable to use in a specific application. Cost is always a major factor and the NiMH battery tops the list in price with the flooded lead-acid battery being the most inexpensive. Evercel manufactures the Ni-Z battery and by a patented process, with the claim to have the highest power-per-pound ratio of any battery. See Table 1 below for comparisons among the various batteries. What is lost in the cost translation is the fact that NiMH batteries yield nearly twice the performance (energy density per weight of the battery) than do conventional lead-acid batteries. A major drawback to the NIMH battery is the very high self-discharge rate of approximately 5 to 10% per day. This would make the battery useless in a few weeks. The Ni-Cad battery as does the lead-acid battery also has self-discharge but it is in the range of about 1% per day and both contain hazardous materials such as acid or highly toxic cadmium. The Ni-Z and the NiMH batteries contain potassium hydroxide and this electrolyte in moderate and high concentrations is very caustic and will cause severe burns to tissue and corrosion to many metals such as beryllium, magnesium, aluminum, zinc, and tin.

Another factor that must be considered when making a battery comparison is the recharge time. Lead-acid batteries require a very long recharge period, as long as 6 to 8 hours. Lead-acid batteries, because of their chemical makeup, cannot sustain high current or voltage continuously during charging. The lead plates within the battery heat rapidly and cool very slowly. Too much heat results in a condition known as "gassing" where hydrogen and oxygen gases are released from the battery's vent cap. Over time, gassing reduces the effectiveness of the battery and also increases the need for battery maintenance, i.e., requiring periodic deionized or distilled water addition. Batteries such as Ni-Cad and NiMH are not as susceptible to heat and can be recharged in less time, allowing for high current or voltage changes which can bring the battery from a 20% state of charge to an 80% state of charge in as quick as 20 minutes. The time to fully recharge these batteries can take longer than an hour. Common to all present day batteries is a finite life and if they are fully discharged and recharged on a regular basis their life is reduced considerably.

SUMMARY OF THE INVENTION

In accordance with the illustrated preferred embodiment, the present invention provides a unique electrical-energy-storage unit that has the capability to store ultrahigh amounts of energy.

One aspect of the present invention is that the materials used to produce the energy-storage unit, EESU, are not explosive, corrosive, or hazardous. The basis material, a high-permittivity calcined composition-modified barium titanate powder is an inert powder and is described in the following references: S. A. Bruno, D. K. Swanson, and I. Burn, J. Am Ceram. Soc. 76, 1233 (1993); P. Hansen, U.S. Pat. No. 6,078, 494, issued Jun. 20, 2000. The most cost-effective metal that can be used for the conduction paths is nickel. Nickel as a metal is not hazardous and only becomes a problem if it is in solution such as in deposition of electroless nickel. None of the EESU materials will explode when being recharged or impacted. Thus the EESU is a safe product when used in electric vehicles, buses, bicycles, tractors, or any device that is used for transportation or to perform work. It could also be used for storing electrical power generated from solar voltaic cells or other alternative sources for residential, commercial, or industrial applications. The EESU will also allow power averaging of power plants utilizing SPVC or wind technology and will have the capability to provide this function by storing sufficient electrical energy so that when the sun is not shinning or the wind is not blowing they can meet the energy requirements of residential, commercial, and industrial sites.

Another aspect of the present invention is that the EESU initial specifications will not degrade due to being fully discharged or recharged. Deep cycling the EESU through the life of any commercial product that may use it will not cause the EESU specifications to be degraded. The EESU can also be rapidly charged without damaging the material or reducing its life. The cycle time to fully charge a 52 kW·h EESU would be in the range of 4 to 6 minutes with sufficient cooling of the power cables and connections. This and the ability of a bank of EESUs to store sufficient energy to supply 400 electric vehicles or more with a single charge will allow electrical energy stations that have the same features as the present day gasoline stations for the ICE cars. The bank of EESUs will store the energy being delivered to it from the present day utility power grid during the night when demand is low and then deliver the energy when the demand hits a peak. The EESU energy bank will be charging during the peak times but at a rate that is sufficient to provide a full charge of the bank over a 24-hour period or less. This method of electrical power averaging would reduce the number of power generating stations required and the charging energy could also come from alternative sources. These electrical-energy-delivery stations will not have the hazards of the explosive gasoline.

Yet another aspect of the present invention is that the coating of aluminum oxide and calcium magnesium aluminosilicate glass on calcined composition-modified barium titanate powder provides many enhancement features and manufacturing capabilities to the basis material. These coating materials have exceptional high voltage breakdown and when coated onto the above material will increase the breakdown voltage of ceramics comprised of the coated particles from $3 \times 10^6$ V/cm of the uncoated basis material to around $5 \times 10^6$ V/cm or higher. The following reference indicates the dielectirc breakdown strength in V/cm of such materials: J. Kuwata et al., "Electrical Properties of Perovskite-Type Oxide Thin-Films Prepared by RF Sputtering", Jpn. J. Appl. Phys., Part 1, 1985, 24(Suppl. 24-2, Proc. Int. Meet. Ferroelectr., $6^{th}$), 413-15. This very high voltage breakdown assists in allowing the ceramic EESU to store a large amount of energy due to the following: Stored energy $E = CV^2/2$, Formula 1, as indicated in F. Sears et al., "Capacitance—Properties of Dielectrics", University Physics, Addison-Wesley Publishing Company, Inc.: December 1957: pp 468-486, where C is the capacitance, V is the voltage across the EESU terminals, and E is the stored energy. This indicates that the energy of the EESU increases with the square of the voltage. FIG. 1 indicates that a double array of 2230 energy storage components 9 in a parallel configuration that contain the calcined composition-modified barium titanate powder. Fully densified ceramic components of this powder coated with 100 Å of aluminum oxide as the first coating 8 and a 100 Å of calcium magnesium aluminosilicate glass as the second coating 8 can be safely charged to 3500 V. The number of components used in the double array depends on the electrical energy storage requirements of the application. The components used in the array can vary from 2 to 10,000 or more. The total capacitance of this particular array 9 is 31 F which will allow 52,220 W·h of energy to be stored as derived by Formula 1.

These coatings also assist in significantly lowering the leakage and aging of ceramic components comprised of the calcined composition-modified barium titanate powder to a point where they will not effect the performance of the EESU. In fact, the discharge rate of the ceramic EESU will be lower than 0.1% per 30 days which is approximately an order of magnitude lower than the best electrochemical battery.

A significant advantage of the present invention is that the calcium magnesium aluminosilicate glass coating assists in lowering the sintering and hot-isostatic-pressing temperatures to 800° C. This lower temperature eliminates the need to use expensive platinum, palladium, or palladium-silver alloy as the terminal metal. In fact, this temperature is in a safe range that allows nickel to be used, providing a major cost saving in material expense and also power usage during the hot-isostatic-pressing process. Also, since the glass becomes easily deformable and flowable at these temperatures it will assist in removing the voids from the EESU material during the hot-isostatic-pressing process. The manufacturer of such systems is Flow Autoclave Systems, Inc. For this product to be successful it is mandatory that all voids be removed to assist in ensuring that the high voltage breakdown can be obtained. Also, the method described in this patent of coating the calcium magnesium aluminosilicate glass ensures that the hot-isostatic-pressed double-coated composition-modified barium titanate high-relative-permittivity layer is uniform and homogeneous.

Figure 2:
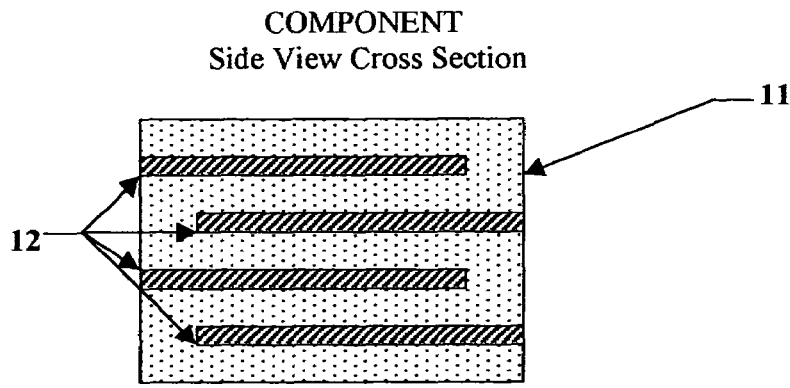

Yet another aspect of the present invention is that each component of the EESU is produced by screen-printing multiple layers of nickel electrodes with screening ink from nickel powder. Interleaved between nickel electrodes are dielectric layers with screening ink from calcined double-coated high-permittivity calcined composition-modified barium titanate powder. A unique independent dual screen-printing and layer-drying system is used for this procedure. Each screening ink contains appropriate plastic resins, surfactants, lubricants, and solvents, resulting in a proper rheology for screen printing. The number of these layers can vary depending on the electrical energy storage requirements. Each layer is dried before the next layer is screen printed. Each nickel electrode layer 12 is alternately preferentially aligned to each of two opposite sides of the component automatically during this process as indicated in FIG. 2. These layers are screen printed on top of one another in a continuous manner. When the specified number of layers is achieved, the component layers are then baked to obtain by further drying sufficient handling strength of the green plastic body. Then the array is cut into individual components to the specified sizes.

Alternatively, the dielectric powder is prepared by blending with plastic binders, surfactants, lubricants, and solvents to obtain a slurry with the proper rheology for tape casting. In tape casting, the powder-binder mixture is extruded by pressure through a narrow slit of appropriate aperture height for the thickness desired of the green plastic ceramic layer onto a moving plastic-tape carrier, known as a doctor-blade web coater. After drying to develop sufficient handling strength of the green plastic ceramic layer this layer is peeled away from the plastic-tape carrier. The green plastic ceramic layer is cut into sheets to fit the screen-printing frame in which the electrode pattern is applied with nickel ink. After drying of the electrode pattern, the sheets are stacked and then pressed together to assure a well-bonded lamination. The laminate is then cut into components of the desired shape and size.

Figure 3:
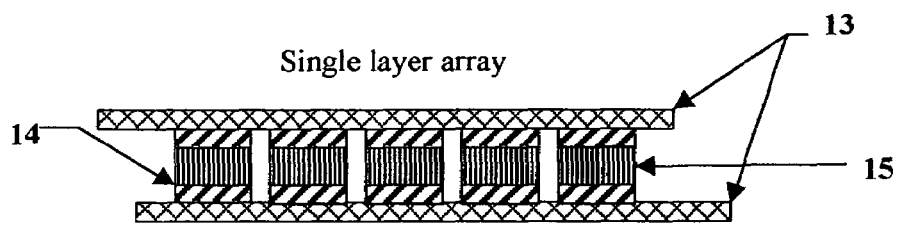
Figure 4:
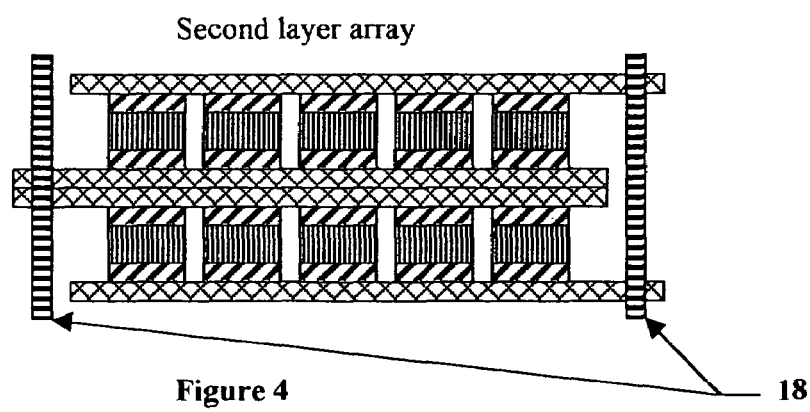

The components are treated for the binder-burnout and sintering steps. The furnace temperature is slowly ramped up to 350° C. and held for a specified length of time. This heating is accomplished over a period of several hours so as to avoid any cracking and delamination of the body. Then the temperature is ramped up to 850° C. and held for a specified length of time. After this process is completed the components are then properly prepared for the hot isostatic pressing at 700° C. and the specified pressure. This process will eliminate voids. After this process the components are then side lapped on the connection side to expose the preferentially aligned nickel electrodes 12. Then these sides are dipped into ink from nickel powder that has been prepared to have the desired rheology. Then side conductors of nickel 14 are dipped into the same ink and then are clamped onto each side of the components 15 that have been dipped into the nickel powder ink. The components are then fired at 800° C. for 20 minutes to bond the nickel bars to the components as indicated in FIG. 3. The components are then assembled into a first-level array, FIG. 3, with the use of the proper tooling and solder-bump technology. Then the first-level arrays are assembled into a second-level array, FIG. 4, by stacking the first array layers on top of one another in a preferential mode. Then nickel bars 18 are attached on each side of the second array as indicated in FIG. 4. Then the EESU is packaged into its final assembly.

The features of this patent indicate that the ceramic EESU, as indicated in Table 1, outperforms the electrochemical battery in every parameter. This technology will provide mission-critical capability to many sections of the energy-storage industry.

TABLE 1

The parameters of each technology to store 52.2 kW · h of electrical energy are indicated - (data as of February 2001 from manufacturers' specification sheets).

|  | NiMH | LA (Gel) | Ceramic EESU | Ni-Z |
|---|---|---|---|---|
| Weight (pounds) | 1716 | 3646 | 336 | 1920 |
| Volume (inch$^3$) | 17,881 | 43,045 | 2005 | 34,780 |
| Discharge rate | 5%/30 days | 1%/30 days | 0.1%/30 days | 1%/30 days |
| Charging time (full) | 1.5 hr | 8.0 hr | 3-6 min | 1.5 hr |
| Life reduced with deep cycle use | moderate | high | none | moderate |
| Hazardous materials | YES | YES | NONE | YES |

This EESU will have the potential to revolutionize the electric vehicle (EV) industry, the storage and use of electrical energy generated from alternative sources with the present utility grid system as a backup source for residential, commercial, and industrial sites, and the electric energy point of sales to EVs. The EESU will replace the electrochemical battery in any of the applications that are associated with the above business areas or in any business area where its features are required.

The features and advantages described in the specifications are not all inclusive, and particularly, many additional features and advantages will be apparent to one of ordinary skill in the art in view of the description, specification and claims hereof Moreover, it should be noted that the language used in the specification has been principally selected for readability and instructional purposes, and may not have been selected to delineate or circumscribe the inventive subject matter, resort to the claims being necessary to determine such inventive subject matter.

DESCRIPTION—FIGS. 1 TO 4

FIG. 1 indicates a schematic of 2320 energy storage components 9 hooked up in parallel with a total capacitance of 31 farads. The maximum charge voltage 8 of 3500 V is indicated with the cathode end of the energy storage components 9 hooked to system ground 10.

FIG. 2 is a cross-section side view of the electrical-energy-storage unit component. This figure indicates the alternating layers of nickel electrode layers 12 and high-permittivity composition-modified barium titanate dielectric layers 11. This figure also indicate the preferentially aligning concept of the nickel electrode layers 12 so that each storage layer can be hooked up in parallel.

FIG. 3 is side view of a single-layer array indicating the attachment of individual components 15 with the nickel side bars 14 attached to two preferentially aligned copper conducting sheets 13.

FIG. 4 is a side view of a double-layer array with copper array connecting nickel bars 16 attaching the two arrays via the edges of the preferentially aligned copper conductor sheets 13. This figure indicates the method of attaching the components in a multilayer array to provide the required energy storage.

REFERENCE NUMERALS IN DRAWING

8 System maximum voltage of 3500 V
9 2320 energy-storage components hooked up in parallel with a total capacitance of 31 F
10 System ground
11 High-permittivity calcined composition-modified barium titanate dielectric layers
12 Preferentially aligned nickel electrode layers
13 Copper conductor sheets
14 Nickel sidebars
15 Components
16 Copper array connecting nickel bars

DETAILED DESCRIPTION OF THE PREFERRED EMBODIMENTS

FIGS. 1, 2, 3, and 4 of the drawings and the following description depict various preferred embodiments of the present invention for purposes of illustration only. One skilled in the art will readily recognize from the following discussion those alternative embodiments of the structures and methods illustrated herein may be employed without departing from the principles of the invention described herein. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the claims.

Preparation of the high-permittivity calcined composition-modified barium titanate powder that is used to fabricate the EESU is explained as follows. Wet-chemical-prepared powders of high-purity and also composition-modified barium titanate with narrow particle-size distribution have been produced with clear advantages over those prepared by solid-state reaction of mechanically mixed, ball-milled, and calcined powdered ingredients. The compositional and particle-size uniformity attained with a coprecipitated-prepared powder is vastly superior to that with a conventional-prepared powder. The microstructures of ceramics formed from these calcined wet-chemical-prepared powders are uniform in grain size and can also result in smaller grain size. Electrical properties are improved so that higher relative permittivities and increased dielectric breakdown strengths can be obtained. Further improvement can be obtained by the elimination of voids within the sintered ceramic body with subsequent hot isostatic pressing.

High-relative-permittivity dielectrics have inherent problems, namely aging, fatigue, degradation, and decay of the electrical properties, which limit their application. The use of surface-coated powders in which the surface region is comprised of one or two materials different in composition from that of the powder overcomes these problems provided that the compositions are appropriately chosen.

Among ceramics, alumina [aluminum oxide ($Al_2O_3$)], and among glasses, calcium magnesium aluminosilicate ($CaO.MgO.Al_2O_3.SiO_2$) glasses are the best dielectrics in terms of having the highest dielectric breakdown strengths and to seal the high-relative-permittivity dielectric powder particles so as to eliminate or significantly reduce their inherent problems.

A glass with a given composition at temperatures below its glass transition temperature range, which is in the neighborhood of its strain point temperature, is in a fully rigid condition, but at temperatures above this range is in a viscous-flow condition, its viscosity decreasing with increasing temperature. The application of hot isostatic pressing to a sintered closed-pore porous ceramic body comprised of sufficient-thickness glass-coated powder will lead to void elimination provided the glass is in the viscous-flow condition where it is easily deformable and flowable.

The wet-chemical-prepared and calcined composition-modified barium titanate powder is accordingly coated with these layers of, first, alumina, and second, a calcium magnesium aluminosilicate glass. After the first layer has been applied by wet-chemical means, the powder is calcined at 1050° C. to convert the precursor, aluminum nitrate nonahydrate [$Al(NO_3)_3.9H_2O$] to aluminum oxide (corundum) [$\alpha$-$Al_2O_3$]. Then the second layer is applied by wet-chemical means with the use of the precursors in the appropriate amounts of each, and in absolute ethanol ($CH_3CH_2OH$) as the solvent, shown in the accompanying table. After drying, the powder is calcined at 500° C. to convert the precursor mixture to a calcium magnesium aluminosilicate glass. It is important that the calcining temperature is not higher than the strain point of the selected glass composition to prevent sticking together of the powder. The glass coating has the further advantage of acting as a sintering aid and allowing a substantially lower firing temperature for densification of the ceramic body particularly during the hot-isostatic-pressing step.

Another significant advantage of the calcium magnesium aluminosilicate glass coating is that sintering and densification temperatures are sufficiently lowered to allow the use of nickel conductor electrodes in place of the conventional expensive platinum, palladium, or palladium-silver alloy ones.

Preparation of the calcined composition-modified barium titanate powder is indicated by the following process steps.

A solution of the precursors: $Ba(NO_3)_2$, $Ca(NO_3)_2.4H_2O$, $Nd(NO_3)_3.6H_2O$, $Y(NO_3)_3.4H_2O$, $Mn(CH_3COO)_2.4H_2O$, $ZrO(NO_3)_2$, and [$CH_3CH(O-)COONH_4]_2Ti(OH)_2$, as selected from the reference; Sigma-Aldrich, Corp., "Handbook of Fine Chemicals and Laboratory Equipment", 2000-2001, in deionized water heated to 80° C. is made in the proportionate amount in weight percent for each of the seven precursors as shown in the most right-hand column of Table 3.

A separate solution of $(CH_3)_4NOH$ somewhat in excess amount than required, as shown in Table 4, is made in deionized water free of dissolved carbon dioxide ($CO_2$) and heated to 80°-85° C. The two solutions are mixed by pumping the heated ingredient streams simultaneously through a coaxial fluid jet mixer. A slurry of the coprecipitated powder is produced and collected in a drown-out vessel. The coprecipitated powder is refluxed in the drown-out vessel at 90°-95° C. for 12 hr and then filtered, deionized-water washed, and dried. Alternatively, the powder may be collected by centrifugal sedimentation. An advantage of $(CH_3)_4NOH$ as the strong base reactant is that there are no metal element ion residuals to wash away anyway. Any residual $(CH_3)_4NOH$, like any residual anions from the precursors, is harmless, because removal by volatilization and decomposition occurs during the calcining step. The powder contained in a silica glass tray or tube is calcined at 1050° C. in air. Alternatively, an alumina ceramic tray can be used as the container for the powder during calcining.

Compostion-modified barium titanate with metal element atom fractions as follows:

TABLE 2

Composition-modified barium titanate with metal element atom fractions given for an optimum result, as demonstrated in the reference: P. Hansen, U.S. Pat. No. 6,078,494, issued Jan. 20, 2000.

| Metal element | Atom fraction | At Wt | Product | Wt % |
|---|---|---|---|---|
| Ba | 0.9575 | 137.327 | 131.49060 | 98.52855 |
| Ca | 0.0400 | 40.078 | 1.60312 | 1.20125 |
| Nd | 0.0025 | 144.240 | 0.36060 | 0.27020 |
| Total | 1.0000 | | | 100.00000 |
| Ti | 0.8150 | 47.867 | 39.01161 | 69.92390 |
| Zr | 0.1800 | 91.224 | 16.42032 | 29.43157 |
| Mn | 0.0025 | 54.93085 | 0.13733 | 0.24614 |
| Y | 0.0025 | 88.90585 | 0.22226 | 0.39839 |
| Total | 1.0000 | | | 100.00000 |

TABLE 3

Water-soluble precursors and reactant strong base for wet-chemical-prepared powder of a composition-modified barium titanate by a coprecipitation procedure

| Precursor | Formula | FW | Mol fraction | Product | Wt % | Multiplier factor | Product | Wt % |
|---|---|---|---|---|---|---|---|---|
| Barium nitrate | $Ba(NO_3)_2$ | 261.34 | 0.9575 | 250.233050 | 95.95748 | 1.0 | 95.95748 | 48.09898 |
| Calcium nitrate tetrahydrate | $Ca(NO_3)_2.4H_2O$ | 236.15 | 0.0400 | 9.446000 | 3.62228 | 1.0 | 3.62228 | 1.81568 |
| Neodymium nitrate hexahydrate | $Nd(NO_3)_3.6H_2O$ | 438.35 | 0.0025 | 1.095875 | 0.42024 | 1.0 | 0.42024 | 0.21065 |
| Yttrium nitrate tetrahydrate | $Y(NO_3)_3.4H_2O$ | 346.98 | 0.0025 | 0.86745 | 0.30676 | 0.995 | 0.30523 | 0.15300 |
| Manganese(II) acetate tetrahydrate | $Mn(CH_3COO)_2.4H_2O$ | 245.08 | 0.0025 | 0.61270 | 0.21667 | 0.995 | 0.21559 | 0.10806 |
| Oxozirconium(IV) nitrate | $ZrO(NO_3)_2$ | 231.23 | 0.1800 | 41.62140 | 14.71882 | 0.995 | 14.64523 | 7.34097 |
| Bis(ammonium lactato) dihydroxotitanium(IV) | [$CH_3CH(O-)COONH_4]_2Ti(OH)_2$ | 294.08 | 0.8150 | 239.67520 | 84.75775 | 0.995 | 84.33396 | 42.27266 |
| | | | | | | Total | | 100.00000 |
| Reactant strong base Tetramethylammonium hydroxide | $(CH_3)_4NOH$ | 91.15 | | | | | | |

TABLE 4

Calculation of minimum amount of $(CH_3)_4NOH$ required for 100 g of the precursor mixture

| Precursor | FW | Wt % | Wt %/FW | Reactant base multiplier | Mol of base required |
|---|---|---|---|---|---|
| $Ba(NO_3)_2$ | 261.34 | 48.09898 | 0.184048 | 2 | 0.368095 |
| $Ca(NO_3)_2 \cdot 4H_2O$ | 236.15 | 1.81568 | 0.007689 | 2 | 0.015377 |
| $Nd(NO_3)_3 \cdot 6H_2O$ | 438.35 | 0.21065 | 0.000481 | 3 | 0.001442 |
| $Y(NO_3)_3 \cdot 4H_2O$ | 346.98 | 0.15300 | 0.000441 | 3 | 0.001323 |
| $Mn(CH_3COO)_2 \cdot 4H_2O$ | 245.08 | 0.10806 | 0.000441 | 2 | 0.000882 |
| $ZrO(NO_3)_2$ | 231.23 | 7.34097 | 0.031747 | 2 | 0.063495 |
| $[CH_3CH(O-)COONH_4]_2Ti(OH)_2$ | 294.08 | 42.27266 | 0.143745 | 2 | 0.287491 |
| | Total | 100.00000 | | | 0.738105 |
| Reactant strong base $(CH_3)_4NOH$ | 91.15 | The wt of $(CH_3)_4NOH$ required is accordingly a minimum of (0.738105 mol) (91.15 g/mol) = 67.278 g for 100 g of the precursor mixture. | | | |

Note:
Tetramethylammonium hydroxide $(CH_3)_4NOH$ is a strong base.

Coating of Aluminum Oxide on Calcined Modified Barium Titanate Powder

| | | |
|---|---|---|
| Barium titanate $BaTiO_3$ | FW 233.19 | d 6.080 g/cm³ |
| Aluminum oxide $Al_2O_3$ | FW 101.96 | d 3.980 g/cm³ |
| Precursor, aluminum nitrate nonahydrate, as selected from the reference: Sigma-Aldrich Corp., "Handbook of Fine Chemicals and Laboratory Equipment", 2000-2001. $Al(NO_3)_3 \cdot 9H_2O$ | FW 375.13 | |

For calcined aluminum oxide $(Al_2O_3)$ coating of 100 Å thickness on calcined modified barium titanate powder $100 \text{ Å} = 10^{-6}$ cm  $1.0 \text{ m}^2 = 10^4 \text{ cm}^2$ area thickness of $Al_2O_3$ coating volume $(10^4 \text{ cm}^2/\text{g})(10^{-6} \text{ cm}) = 10^{-2} \text{ cm}^3/\text{g}$ of calcined powder $$\frac{(10^{-2} \text{ cm}^3 \text{ volume } Al_2O_3 \text{ coating}) \times (3.98 \text{ g/cm}^3 \text{ density of } Al_2O_3)}{\text{g of calcined powder}} = \frac{39.8 \times 10^{-3} \text{ g of } Al_2O_3 \text{ coating}}{\text{g of calcined powder}}$$

$$= \frac{39.8 \text{ mg of } Al_2O_3}{\text{g of calcined powder}}$$

or $Al(NO_3)_3 \cdot 9H_2O$ (FW 375.13)(2) = 750.26

$Al_2O_3$ FW 101.96 = 101.96

750.26/101.96 = 7.358

$$\frac{(7.358)(39.8 \text{ mg of } Al_2O_3 \text{ coating})}{\text{g of calcined powder}} = \frac{292.848 \text{ mg of } Al(NO_3)_3 \cdot 9H_2O}{\text{g of calcined powder}}$$

For an aluminum oxide $(Al_2O_3)$ coating of 100 Å thickness on calcined modified barium titanate powder with particle volume of 1.0 µm³, 39.8 mg of $Al_2O_3$ are required per g of this powder, corresponding to 292.848 mg of the aluminum nitrate nonahydrate $[Al(NO_3)_3 \cdot 9H_2O]$ precursor required per g of this powder.

Coating of calcium magnesium aluminosilicate glass on aluminum oxide coated calcined modified barium titanate powder

| | | FW g/mol | d g/cm³ |
|---|---|---|---|
| Barium titanate | $BaTiO_3$ | 233.19 | 6.080 |
| Calcium magnesium aluminosilicate $(CaO \cdot MgO \cdot Al_2O_3 \cdot SiO_2)$ glass precursors, as selected from the reference: Sigma-Aldrich, Corp., "Handbook of Fine Chemicals and Laboratory Equipment", 2000-2001. | | | |
| Calcium methoxide | $(CH_3O)_2Ca$ | 101.15 | |
| Calcium isopropoxide | $[(CH_3)_2CHO]_2Ca$ | 158.25 | |
| Magnesium methoxide | $(CH_3O)_2Mg$ | 86.37 | |
| Magnesium ethoxide | $(CH_3CH_2O)_2Mg$ | 114.43 | |
| Aluminum ethoxide | $(CH_3CH_2O)_3Al$ | 162.16 | |
| Aluminum isopropoxide | $[(CH_3)_2CHO]_3Al$ | 204.25 | |
| Aluminum butoxide | $[CH_3(CH_2)_3O]_3Al$ | 246.33 | |
| Tetraethyl orthosilicate | $Si(OCH_2CH_3)_4$ | 208.33 | |
| Select glass composition, e.g., $CaO \cdot MgO \cdot 2Al_2O_3 \cdot 8SiO_2$ | | | |

-continued

|  | FW g/mol | d g/cm³ |
|---|---|---| and accordingly the precursors:

1 mol (158.25 g) calcium isopropoxide
1 mol (114.43 g) magnesium ethoxide
4 mol (817.00 g) aluminum isopropoxide
8 mol (1666.64 g) tetraethyl orthosilicate 2756.32 g for 1.0 mol of glass Prepare mixture of these precursors in absolute ethanol (to avoid hydrolysis) and in dry-air environment (dry box) (also to avoid hydrolysis).

Glass composition: $CaO.MgO.2Al_2O_3.8SiO_2$ or $CaMgAl_4Si_8O_{24}$
   1 mol (56.08 g)                                  CaO
   1 mol (40.30 g)                                  MgO
   2 mol (101.96 g × 2 = 203.92 g)                  $Al_2O_3$
   8 mol (60.08 g × 8 = 480.64 g)                   $SiO_2$
      glass FW total    780.98 g/mol
      Density of glass: ≃ 2.50 g/cm³
Calcined modified barium titanate powder
Particle volume: 1.0 μm³ or $1.0(10^{-4} cm)^3 = 10^{-12}$ cm³;
so there are $10^{12}$ particles/cm³ (assumption of no voids)
Particle area: 6 μm² or $(6)(10^{-4} cm)^2 = 6 \times 10^{-8}$ cm²
Particle area/cm³ (no voids):
$(6 \times 10^{-8} cm^2/particle)(10^{12} particles/cm^3) = 6 \times 10^4$ cm²/cm³
or 6 m²/cm³.

Then for density of 6 g/cm³, the result is $\frac{6 \ m^2/cm^3}{6 \ g/cm^3} = 1.0$ m²/g For calcined glass coating of 100 Å thickness on calcined powder $100 Å = 10^{-6}$ cm        $1.0 \ m^2 = 10^4 \ cm^2$
$(10^4 \ cm^2/g)(10^{-6} \ cm) = 10^{-2} \ cm^3/g$ of calcined powder of glass coating
and then $\frac{(10^{-2} \ cm^3 \text{ of glass coating})}{g \text{ of calcined powder}} \times$ $(2.50 \ g/cm^3 \text{ density of glass}) = \frac{25.0 \times 10^{-3} \text{ g of glass coating}}{g \text{ of calcined powder}}$ or $\frac{25.0 \text{ mg of glass coating}}{g \text{ of calcined powder}}$ Precursor mixture FW  $\frac{2756.32}{780.98} = 3.529$
Glass                FW $\frac{(3.529)(25.0 \text{ mg of glass coating})}{(g \text{ of calcined powder})} = 88.228$ mg of precursor mixture For a $CaMgAl_4Si_8O_{24}$ glass coating of 100 Å thickness on calcined modified barium titanate powder with particle volume of 1.0 μm³, 25.0 mg of this glass are required per g of this powder, corresponding to 88.228 mg of the precursor mixture required per g of this powder.
Particle volume and area
V particle = a³ for cube
If a = 1.0 μm, V = 1.0 μm³
A particle = 6 a² for cube
If a = 1.0 μm, A = 6 μm²
Particle coating volume
$(6 a^2)(t)$, if t = 100 Å = $10 \times 10^{-3}$ μm, and 6 a² = 6.0 μm², then
$(6.0 \ \mu m^2)(10 \times 10^{-3} \ \mu m) = 60 \times 10^{-3}$ μm³ = V coating
Ratio of particle coating volume to particle volume
$60 \times 10^{-3} \ \mu m^3/1.0 \ \mu m^3 = 60 \times 10^{-3} = 0.06$ or 6%

With the assumption of no voids and absolutely smooth surface, for an ideal cubic particle with volume of 1.0 μm³ and for a particle coating of 100 Å thickness, the coating volume is $60 \times 10^{-3}$ μm³ or 6.0% that of the particle volume.

Calculations of the electrical-energy-storage unit's weight, stored energy, volume, and configuration.

Assumptions:
   The relative permittivity of the high-permittivity powder is nominally 33,500, as given in the reference: P. Hansen, U.S. Pat. No. 6,078,494, issued Jan. 20, 2000.
      The 100 Å coating of $Al_2O_3$ and 100 Å of calcium magnesium aluminosilicate glass will reduce the relative permittivity by 12%.
      K=29,480
   Energy stored by a capacitor: $E = CV^2/(2 \times 3600 \ s/h) = W \cdot h$
      C=capacitance in farads
      V=voltage across the terminals of the capacitor
   It is estimated that is takes 14 hp, 746 watts per hp, to power an electric vehicle running at 60 mph with the lights, radio, and air conditioning on. The energy-storage unit must supply 52,220 W·h or 10,444 W for 5 hours to sustain this speed and energy usage and during this period the EV will have traveled 300 miles.
   Each energy-storage component has 1000 layers.
   $C = \epsilon_o KA/t$
      $\epsilon_o$=permittivity of free space
      K=relative permittivity of the material
      A=area of the energy-storage component layers
      t=thickness of the energy-storage component layers
   Voltage breakdown of the energy-storage components material after coating with $Al_2O_3$ and calcium magnesium aluminosilicate glass will be in the range of $1.0 \times 10^6$ V/cm to $5 \times 10^6$ V/cm or higher. Using the proper voltage breakdown selected from this range could allow the voltage of the energy-storage unit to be 3500 V or higher.
   One hp=746 W

EXAMPLE

Capacitance of one layer=$8.854 \times 10^{-2}$ F/m $\times 2.948 \times 10^4 \times 6.45 \times 10^{-4}$ m²/$12.7 \times 10^{-6}$ m
C=0.000013235 F
With 1000 layers:
   C=0.013235 F
The required energy storage is:
   $E_t$=14 hp×746 W/hp×5 h=52,220 W·h
The total required capacitance of the energy-storage unit:
   $C_r = E_t \times 2 \times 3600 \ s/h/V^2 = 52,220 \ W \cdot h \times 2 \times 3600 \ s/h/(3500 \ V)^2$
   $C_r$=31 F Number of capacitance components required:
$N_c$=31 F/0.013235 F=2320
Volume and weight of energy-storage unit:
Volume of the dielectric material:

$$\text{Volume} = \text{area} \times \text{thickness} \times \text{number of layers}$$
$$= 6.45 \text{ cm}^2 \times 12.72 \times 10^{-4} \text{ cm} \times 1000$$
$$= 8.2 \text{ cm}^3$$

Total volume=8.2 cm³×number of components (2320)= 19,024 cm³
Density of the dielectric material=6.5 g/cm³
Weight of each component=density×volume=53.3 g
Total weight of the dielectric material=53.3 g×2320/454 g per pound=272 pounds
Volume of the nickel conductor layers:
Thickness of the nickel layer is $1 \times 10^{-6}$ m
Volume of each layer=6.45 cm²×1.0×10⁻⁴ cm×1000=0.645 cm³
Density of nickel=8.902 g/cm³
Weight of nickel layers for each component=5.742 g
Total weight of nickel=34 pounds
Total number of capacitance layers and volume of the EESU.
Area required for each component to solder bump=1.1 inch²
A 12×12 array will allow 144 components for each layer of the first array
19 layers of the second array will provide 2736 components which are more than enough to meet the required 2320 components. The distance between the components will be adjusted so that 2320 components will be in each EESU. The second array area will remain the same.
The total weight of the EESU (est.)=336 pounds
The total volume of the EESU (est.)=13.5 inches×13.5 inches×11 inches=2005 inches³—Includes the weight of the container and connecting material.
The total stored energy of the EESU=52,220 W·h From the above description, it will be apparent that the invention disclosed herein provides a novel and advantageous electrical-energy-storage unit composed of unique materials and processes. The foregoing discussion discloses and describes merely exemplary methods and embodiments of the present invention. As will be understood by those familiar with the art, the invention may be embodied in other specific forms and utilize other materials without departing from the spirit or essential characteristics thereof Accordingly, the disclosure of the present invention is intended to be illustrative, but not limiting, of the scope of the invention, which is set forth in the following claims.

What is claimed is:

1. An article of manufacture comprising:
   first and second electrodes; and
   a dielectric layer located between the first and second electrodes, the dielectric layer including high-permittivity ceramic powder particles coated with a first layer of high dielectric breakdown material and isostatically pressed together, wherein the first layer of high dielectric breakdown material comprises material different from the high-permittivity ceramic powder particles, wherein the high-permittivity ceramic powder particles comprise composition-modified barium titanate, wherein the first layer of high dielectric breakdown material comprises alumina.

2. The article of manufacture of claim 1, further comprising a second layer of high breakdown dielectric material, wherein the second layer of high dielectric breakdown material is coated over the first layer of high dielectric breakdown material and comprises material different from the high-permittivity ceramic powder particles and the first layer of high dielectric breakdown material.

3. The article of manufacture of claim 2, wherein the second layer of high dielectric breakdown material is a glass.

4. The article of manufacture of claim 1, wherein at least one of the first and second electrodes includes a nickel electrode.

5. The article of manufacture of claim 2, wherein the second layer of high dielectric breakdown material includes a calcium magnesium aluminosilicate glass.

6. The article of manufacture of claim 2, wherein the second layer of high dielectric breakdown material has a glass transition temperature that is lower than a sintering temperature of the high-permittivity ceramic powder particles.

7. The article of manufacture of claim 1, wherein the first layer has a thickness of about 100 Angstroms.

8. The article of manufacture of claim 2, wherein the second layer has a thickness of about 100 Angstroms.

9. The article of manufacture of claim 1, wherein the coated high permittivity ceramic powder particles have a volume of about 1.0 µm³.

10. The article of manufacture of claim 2, wherein the second layer comprises 6.0% of the volume of the coated high permittivity ceramic powder particles.

11. The article of manufacture of claim 1, wherein the relative permittivity of the coated high permittivity ceramic powder particles is about 29,480.

12. The article of manufacture of claim 1, wherein the dielectric layer has a voltage breakdown greater than $1.0 \times 10^6$ V/cm.

13. The article of manufacture of claim 12, wherein the voltage breakdown is in a range of $1.0 \times 10^6$ V/cm to $5.0 \times 10^6$ V/cm.

14. The article of manufacture of claim 1, wherein the dielectric layer has a thickness of about $12.7 \times 10^{-6}$ m.

15. A capacitor comprising:
   first and second electrodes; and
   a dielectric layer located between the first and second electrodes, the dielectric layer including high-permittivity ceramic powder particles coated with a first layer of high dielectric breakdown material and isostatically pressed together, wherein the first layer of high dielectric breakdown material comprises material different from the high-permittivity ceramic powder particles, wherein the high-permittivity ceramic powder particles comprise composition-modified barium titanate, wherein the first layer of high dielectric breakdown material comprises alumina.

16. The capacitor of claim 15, wherein at least one of the first and second electrodes includes a nickel electrode.

17. The capacitor of claim 15, further comprising a second coating layer comprising a second high dielectric breakdown material.

18. The capacitor of claim 17, wherein the second high dielectric breakdown material comprises a glass.

19. The capacitor of claim 17, wherein the second high dielectric breakdown material comprises calcium magnesium aluminosilicate glass.

20. The capacitor of claim 15, wherein the dielectric layer has a layer has a voltage breakdown greater than $1 \times 10^6$ V/cm.

21. The capacitor of claim 17, wherein the second high dielectric breakdown material has a glass transition temperature that is lower than a sintering temperature of the high-permittivity ceramic particles.

22. The article of manufacture of claim 15, wherein the dielectric layer has a thickness of about $12.7 \times 10^{-6}$ m.

* * * * *